US012056142B2

(12) United States Patent
Lo et al.

(10) Patent No.: US 12,056,142 B2
(45) Date of Patent: Aug. 6, 2024

(54) CONTENT CAPTURE ACROSS DIVERSE SOURCES

(71) Applicant: Dropbox, Inc., San Francisco, CA (US)

(72) Inventors: Min Ming Lo, San Francisco, CA (US); Linjie Ding, San Mateo, CA (US); Jae Lee, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/500,168

(22) Filed: Oct. 13, 2021

(65) Prior Publication Data
US 2022/0035865 A1    Feb. 3, 2022

Related U.S. Application Data

(63) Continuation of application No. 16/009,566, filed on Jun. 15, 2018, now Pat. No. 11,163,787.

(51) Int. Cl.
| | |
|---|---|
| *G06F 17/00* | (2019.01) |
| *G06F 7/00* | (2006.01) |
| *G06F 16/25* | (2019.01) |
| *G06F 16/27* | (2019.01) |
| *G06F 16/901* | (2019.01) |
| *G06F 16/904* | (2019.01) |

(52) U.S. Cl.
CPC ............ *G06F 16/254* (2019.01); *G06F 16/27* (2019.01); *G06F 16/901* (2019.01); *G06F 16/904* (2019.01)

(58) Field of Classification Search
CPC ...... G06F 16/254; G06F 16/27; G06F 16/901; G06F 16/904
USPC .......................................................... 707/602
See application file for complete search history.

(56) References Cited

U.S. PATENT DOCUMENTS

| | | | | |
|---|---|---|---|---|
| 6,473,749 B1 * | 10/2002 | Smith | ..................... | G06F 16/93 707/784 |
| 6,995,768 B2 * | 2/2006 | Jou | ......................... | G06F 9/542 345/440 |
| 7,493,561 B2 * | 2/2009 | Sareen | ................ | G06F 16/4393 715/732 |
| 8,645,383 B2 * | 2/2014 | Brown | .................... | H04L 67/10 707/737 |
| 8,862,646 B1 * | 10/2014 | Murayama | ............ | G06F 16/168 707/831 |
| 9,378,386 B1 * | 6/2016 | Saylor | ................. | G06F 21/6245 |

(Continued)

OTHER PUBLICATIONS

Final Office Action from U.S. Appl. No. 16/009,566, mailed Sep. 15, 2020, 17 pages.

(Continued)

*Primary Examiner* — Pavan Mamillapalli
(74) *Attorney, Agent, or Firm* — Polsinelli PC

(57) ABSTRACT

The disclosed technology relates to a system configured to receive a request to capture active application content of a client application running on a client device and generate, based on raw digital data from the client application, an object structure representing the active application content of the client application. The object structure comprises application data including information about the client application, content data including information about the active application content, and a data block including at least a portion of the raw digital data from the active application content. The system may further store the object structure representing the active application content on the client device.

20 Claims, 8 Drawing Sheets

(56) References Cited

U.S. PATENT DOCUMENTS

| | | | |
|---|---|---|---|
| 9,659,034 B2* | 5/2017 | Lee | G06F 16/58 |
| 10,963,475 B2* | 3/2021 | Chakra | G06F 3/04842 |
| 2002/0002557 A1 | 1/2002 | Straube et al. | |
| 2002/0184170 A1 | 12/2002 | Gilbert et al. | |
| 2003/0002086 A1* | 1/2003 | Thomason | G06F 16/93 |
| | | | 358/448 |
| 2003/0071814 A1* | 4/2003 | Jou | G06F 9/542 |
| | | | 345/440 |
| 2004/0181543 A1* | 9/2004 | Wu | G06F 16/26 |
| 2004/0267694 A1* | 12/2004 | Sakai | G06Q 10/08 |
| | | | 707/999.001 |
| 2011/0145286 A1* | 6/2011 | LaRowe | G06F 16/951 |
| | | | 715/705 |
| 2012/0221659 A1 | 8/2012 | Brown et al. | |
| 2013/0275509 A1 | 10/2013 | Micucci et al. | |
| 2014/0143701 A1* | 5/2014 | Hoyer | G06Q 10/06 |
| | | | 715/772 |
| 2014/0164315 A1 | 6/2014 | Golshan et al. | |
| 2014/0282746 A1* | 9/2014 | Lin | H04N 21/4122 |
| | | | 725/61 |
| 2015/0112927 A1 | 4/2015 | Lee et al. | |
| 2015/0347929 A1* | 12/2015 | Fontebride | G06Q 10/02 |
| | | | 705/5 |
| 2016/0179826 A1* | 6/2016 | Batra | G06F 16/27 |
| | | | 707/756 |
| 2016/0247077 A1* | 8/2016 | Singhal | G06F 16/26 |

OTHER PUBLICATIONS

Non-Final Office Action from U.S. Appl. No. 16/009,566, mailed Apr. 15, 2021, 19 pages.

Non-Final Office Action from U.S. Appl. No. 16/009,566, mailed Mar. 6, 2020, 16 pages.

Notice of Allowance from U.S. Appl. No. 16/009,566, mailed Aug. 20, 2021, 10 pages.

* cited by examiner

CONTENT CAPTURE ACROSS DIVERSE SOURCES

CROSS-REFERENCE TO RELATED APPLICATIONS

This application is a continuation of U.S. application Ser. No. 16/009,566, filed on Jun. 15, 2018, entitled, CONTENT CAPTURE ACROSS DIVERSE SOURCES, which is hereby expressly incorporated herein by reference in its entirety.

TECHNICAL FIELD

The present technology pertains to digital content management services, and more specifically pertains to capturing digital content from a diverse set of applications.

BACKGROUND

Digital content (e.g., files, documents, or other content items) may be generated and/or consumed by a user on a computing device. However, more and more the digital content is now stored, retrieved, or accessed via a network (e.g., the Internet). Each type of digital content may be accessed through an application such as a web browser, an internet music player application, or other application running on a client device. However, because the content items are accessed by different applications, organizing digital content for a user is difficult.

Various content management services allow users to store, access, and manage content items across multiple devices using a network and share these content items with other users. These content items are generally in the form of a file or document generated by an application. However, much of the digital content of interest to a user may not be in the form of a file or document.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
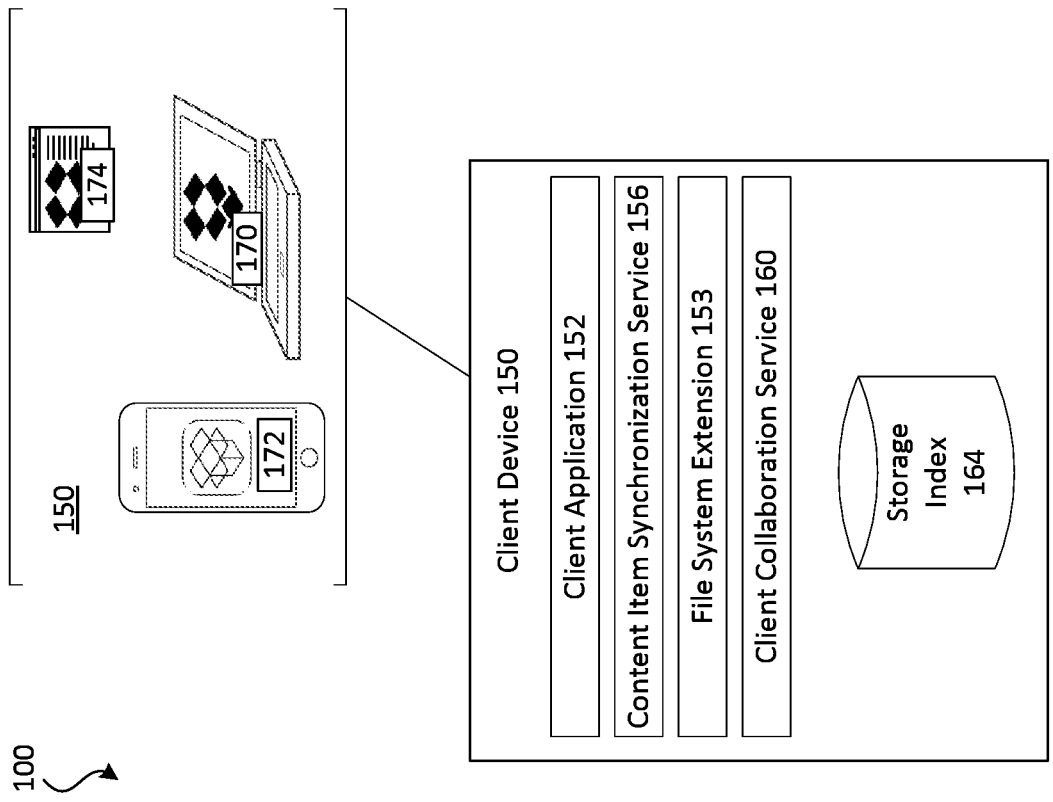
FIG. 1 shows an example of a content management system and client devices, in accordance with some embodiments.
Figure 1:
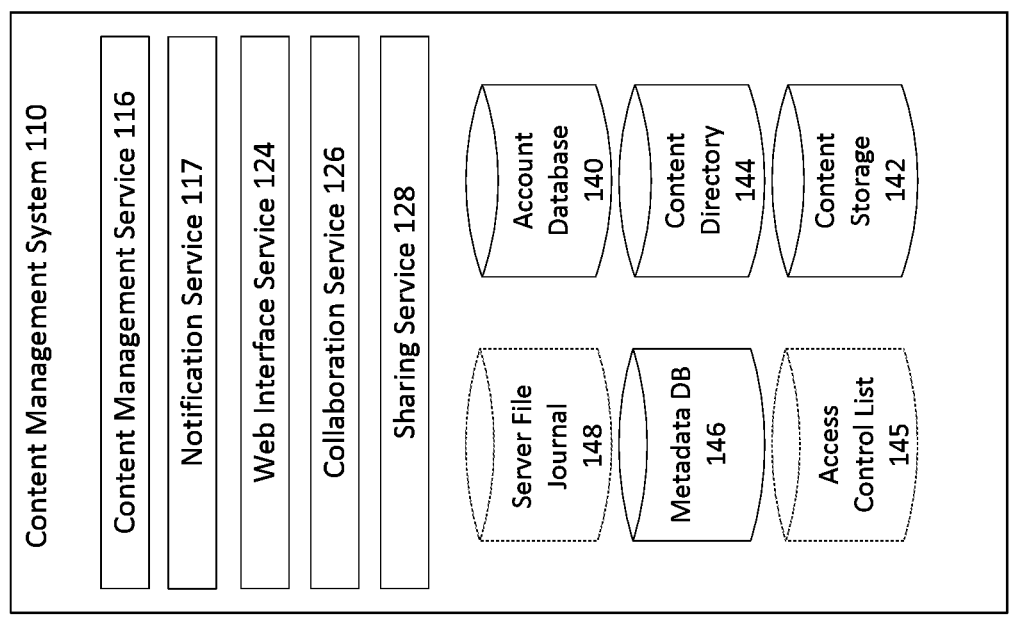

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Digital content of interest to a user may come in many forms and from various sources. For example, digital content may be associated with an application configured to access the digital content and/or a particular source (e.g., a web site or domain, a publisher, or other identifier). These applications may be, for example, social media applications, word processing applications, a web browser, spreadsheet applications, music player applications, or other applications or services available via a client device or provided by a server. The digital content may be available on the client device, on a local data storage medium (e.g., an external drive), or a remote resource available via a network.

Furthermore, although some of the digital content may be in the form of predefined content items such as word documents, image files, audio files, or other predefined units of digital content, some digital content of interest to a user may be in an inconvenient, incomplete, or impractical format. For example, a music application may stream audio content to a client device for the user as well as provide album art, descriptions of the song or artist, and other information that may add to the user's experience. A user may interact with a wide variety of different types of digital content from many different sources.

The disclosed technology addresses the need in the art for allowing users to capture digital content from a number of different sources (e.g., different types of applications, different types of content, different domains, etc.) and providing a central interface for managing the captured digital content. Various embodiments relate to capturing and storing digital content from different types of applications and synchronizing the digital content from the different types of applications across devices. According to some embodiments, this digital content may be stored on a content management system that enables a user to access the digital content on various client devices, share the digital content with other users, and perform other activities provided by the content management system.

The disclosed technology further relates to an application configured to allow a user to view the different applications open on the user's device and save the active digital content of any open application regardless of the format or type of the active digital content and/or application. For example, the active digital content may include a web page or other resource displayed in a web browser application, a file or document opened a file viewing/editing application, a song or video playing in a media player application, or any other type of digital content that is active in an application.

An interpreter may be configured to parse an open application and the digital content currently active in that application in order to generate a representation of the active digital content. The representation may include application data (e.g., open app ID, open app name), active content information (e.g., an item name, item ID, item type, or parsed data from the item), capture data (e.g., a preview snapshot and a timestamp), and a data block for the active digital content (e.g., actual data from the active content). Once generated, the representation of the active digital content may be stored and used to recall the associated digital content at a later time. Furthermore, a collection of representations of active digital content may be indexed and organized it by, for example, application type, project, date, content type, etc. The representations generated for different active digital content saved from open applications can be stored by a content management system and synchronized regardless of the type or format of the application and/or application content for future access by the user.

For example, if the user has multiple tabs opened on the browser for different websites and is playing music on a music application, the user can save the websites from any of the tabs or the music playing on the music application to the user's account on the content management system in their appropriate format so the user can later open the websites or access the music from storage from any device that is logged into the user's account for the content management system. The user can store the different types of application data, such as webpages, songs, files, application pages, on specific folders or projects associated with the user's account for the content management system, search/organize the application data, or open application data saved from any type of application. The user can create collections of saved content from different applications and organize collections as necessary.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, and delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, or move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item.

Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as a folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
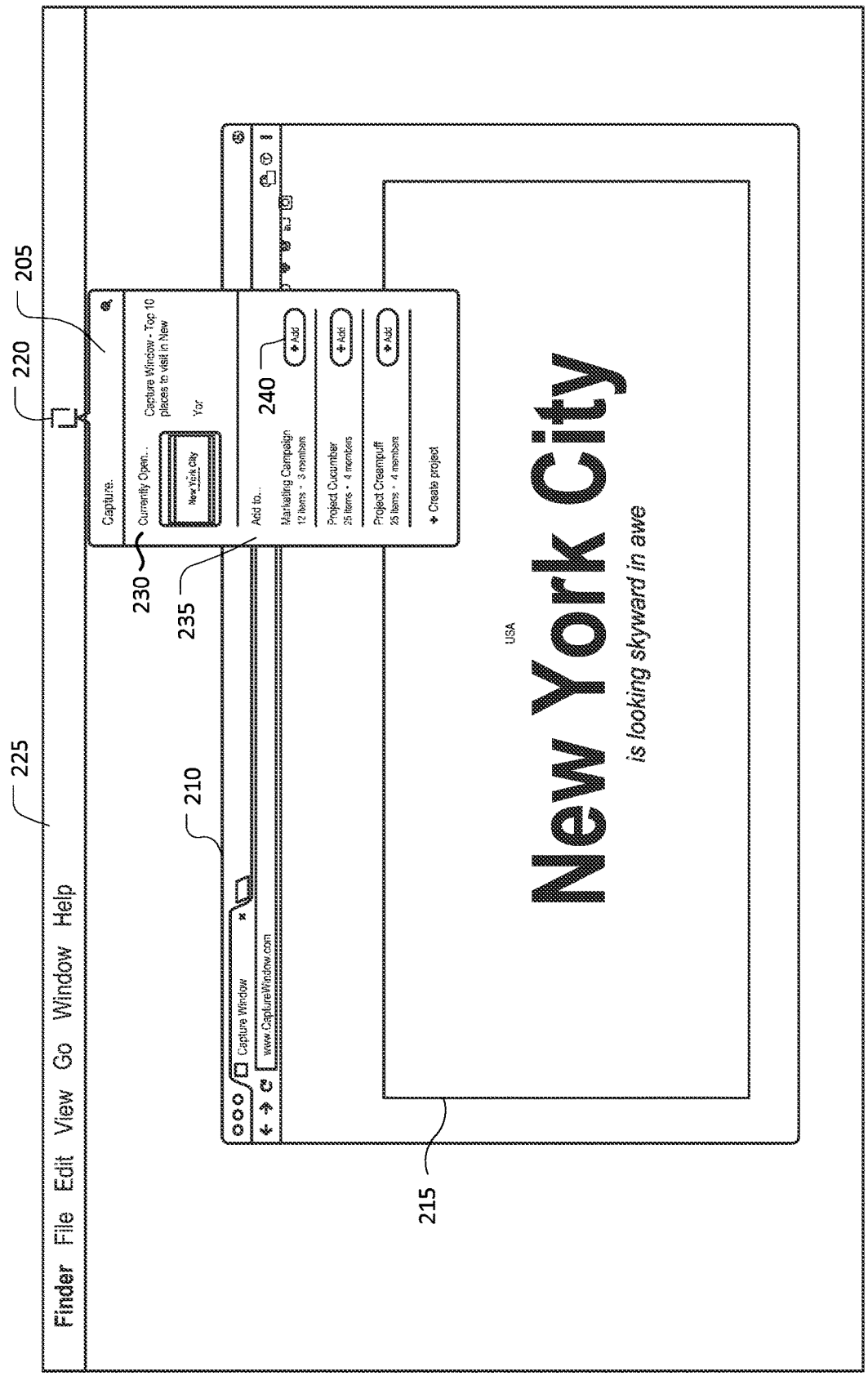
FIG. 2 shows an example graphical user interface configured to enable a user to capture active application content, in accordance with various embodiments of the subject technology.

FIG. 2 shows an example graphical user interface 200 configured to enable a user to capture active application content, in accordance with various embodiments of the subject technology. The graphical user interface 200 may be displayed on a client device and include capture interface 205 and one or more other client applications such as client application 210. The client application 210 may be configured to present digital content to a user or aid the user in experiencing digital content (e.g., provide album art, descriptions, or other information while the user listens to audio digital content). The client application 210 may be a web browser, a music player application, a social media application, a photo viewer or editor, or any other type of application configured to enable a user to experience digital content. In particular, the client application 210 enables a user to experience active application content 215 that is being displayed or otherwise outputted by the client application 210.

Capture interface 205 may be provided by operating system software of the client device, an add-on or other software integrated into the operating system, or a separate client application. The client application providing capture interface 205 may be, for example, client application 152 of FIG. 1 configured to synchronize digital content with a content management system. In FIG. 2, capture interface 205 may be displayed in graphical user interface 200 in response to a user activating interface element 220 located on menu bar 225 or a task bar of graphical user interface 200. However, in other embodiments, capture interface 205 may be displayed in other interface elements such as in a separate client application interface, in the client application associated with the active application content to be captured, or hidden from view.

According to some embodiments, capture interface 205 may display a list 230 of client applications currently open on the client device and enable the user to capture active application content 215 in one or more of the open client applications in the list 230. Capture interface 205 may further allow a user to organize captured active application content by adding the captured active content to a particular group (e.g., a project, category, or other grouping) of captured active content. For example, capture interface 205 in FIG. 2 includes a list 235 of existing projects and allows the user to create a new project as well. Capture interface 205 allows a user to capture active application content 215 for client application 210 and add the captured content to the "Marketing Campaign" project by selecting interface element 240. Although FIG. 2 illustrates the capture of active application content using an interface element (e.g., interface element 240) displayed on a graphical user interface, in other embodiments, other interface elements may also be used to capture active application content. For example, keyboard hotkeys recognition, voice recognition, gesture recognition, or other types of interfaces may also be used.

When a user captures active application content of an open application using capture interface 205, an interpreter parses data from the open application in order to generate an object structure representing the active application content. The object structure may then be stored on the client device and/or uploaded to a content management system for storage and synchronization with other client devices.

The object structure may include, for example, application data, content data, a preview snapshot of the active application content, and a data block including at least a portion of the active application content. The application data may include an application identifier (e.g., an application type, the application name, or another application identifier) associated with the open application. The content data may include information about the application content that is active in the open application or parsed data from the application content. For example, the content data may include a content name, a content identifier, a content type, or metadata parsed from the application content. The preview snapshot may include a graphical representation (e.g., a thumbnail or preview) of the application content that is active in the open application and/or a timestamp associated with the active application content.

The data block for the active digital content may include all or a portion of the application content active in the open application. For example, if the application content is a webpage, file, or document, the data block may include the entire webpage, file, or document, the portion of the webpage, file, or document that is currently in view in the application, or another portion. If the application content is media content such as a song, podcast, slide presentation, or video, the data block may include the entire media item or a portion (e.g., a 20 second clip) of the media item. Storing the data block enables a user to recall the active application content at a later time and open the active application content in the appropriate application.

According to some embodiments, the object structure can be used to generate a representation of active digital content that may be displayed in a graphical user interface and used to enable users to recall, open, or otherwise access the active digital content from storage. The object structure may also be used to index the active digital content so it can be organized by, for example, application name or type, content name or type, project, date, content type, text in the active digital content, or any other information in the object structure.

Figure 3:
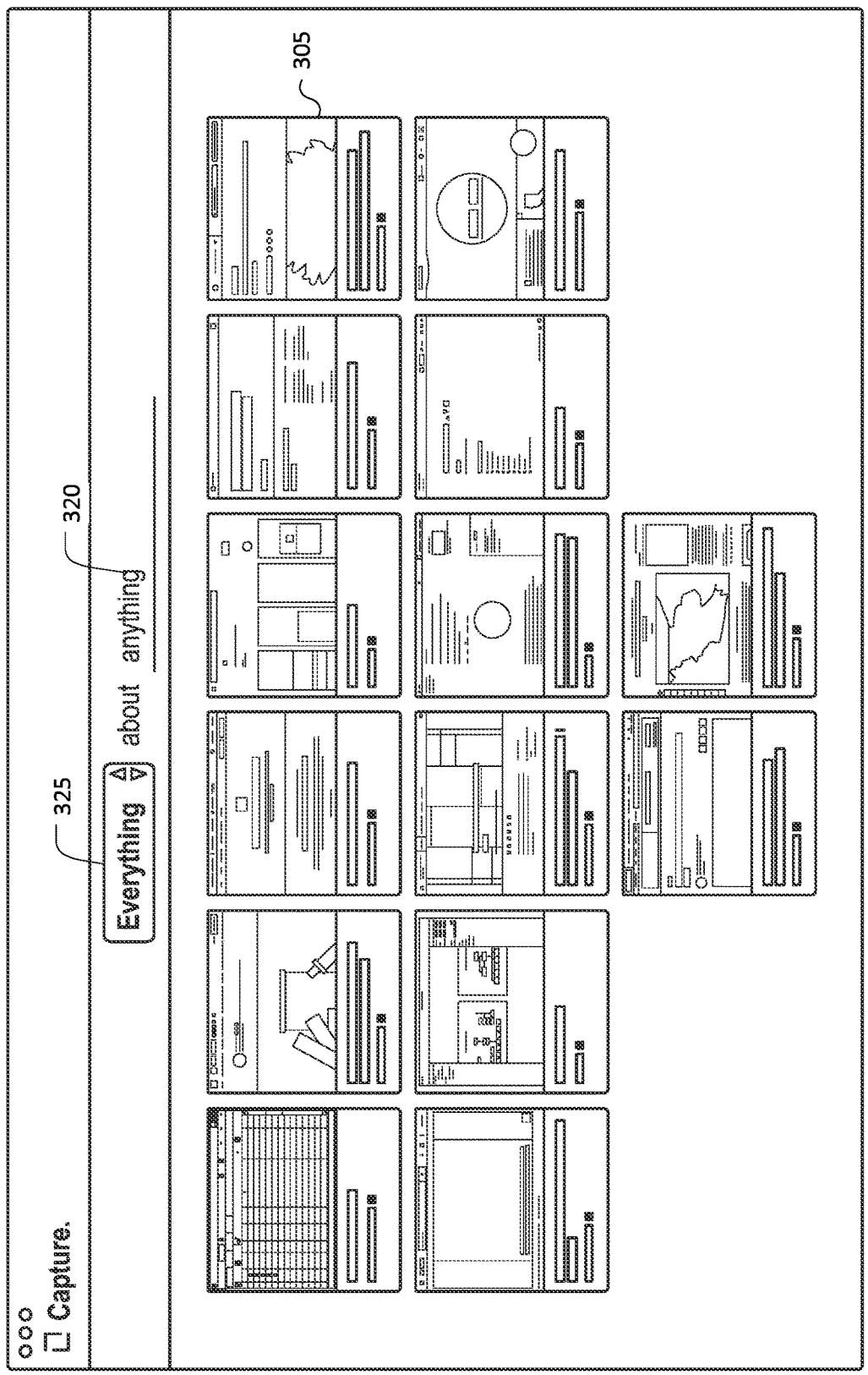
FIG. 3 shows an example graphical user interface displaying representations of active application content, in accordance with various embodiments of the subject technology.

FIG. 3 shows an example graphical user interface 300 displaying representations of active application content, in accordance with various embodiments of the subject technology. The graphical user interface 300 may be displayed by a client application (e.g., a web browser or other client application) running on a client device and include a number of representations 305 of active application content that have been captured and stored. The active application content may be stored on the client device, on a content management system, or both. For example, a content item synchronization service of a client application running on the client device may work with a content management service of a content management system in order to synchronize active application content stored on the client device and/or active application content stored by the content management system.

Each representation of active application content may include a preview snapshot or other graphical representation of the active application content. In some cases the representation may include the preview snapshot from the object structure for the active digital content and/or text associated with the active digital content that is stored in the object structure for the active digital content. The representation for the active application content may also be associated with code that causes the active application to be open upon selection of the representation of the active application content. For example, a user may view a set of captured active application content and select a representation of active application content to open. Selection of the representation of the active application content may cause the object structure to be retrieved and the active application content stored in the data block to be opened in the client application associated with graphical user interface 300 or a separate client application on the client device.

Since the active application content is stored in the object structure on the client device and/or the content management system, the active application content may be opened even if the original source of the active application content is no longer available. For example, if the active application content was a web resource (e.g., a web page, a streaming media file from a cloud service, etc.) and that web resource is no longer being hosted, has been changed, or is unable to be reached, the active application content may still be opened because a copy of the active application content is stored in the data block of the object structure. In other embodiments however, a link (e.g., a universal resource locator) or code to access the original active application content may be stored in the data block instead of or in addition to the copy of the active application content. Accordingly, selection of the representation of the active application content may cause the original source (e.g., the web resource) of the active application content to be requested first. If the original source or the active application content is not available or changed, the copy of the active application content stored in the data block of the object structure may be retrieved and opened. In other embodiments, the choice of whether to retrieve the active application content from the original source or from the data block of the object structure may be provided to the user.

According to other embodiments, a user may also be able to search for desired active application content using various filter parameters or a search interface. For example, graphical user interface 300 includes a search interface 320 and a filter interface element 325. Using the filter interface element 325, a user may filter available active application content items by project, application type, application name, creation date range, content type, or any other information stored in the object structures for the available active application content items. Using the search interface 320, a user may search for desired one or more active application content items from the set of available active application content items based on, for example, a keyword. According to other embodiments, a user may also be able to group and manage active application content items.

Figure 4A:
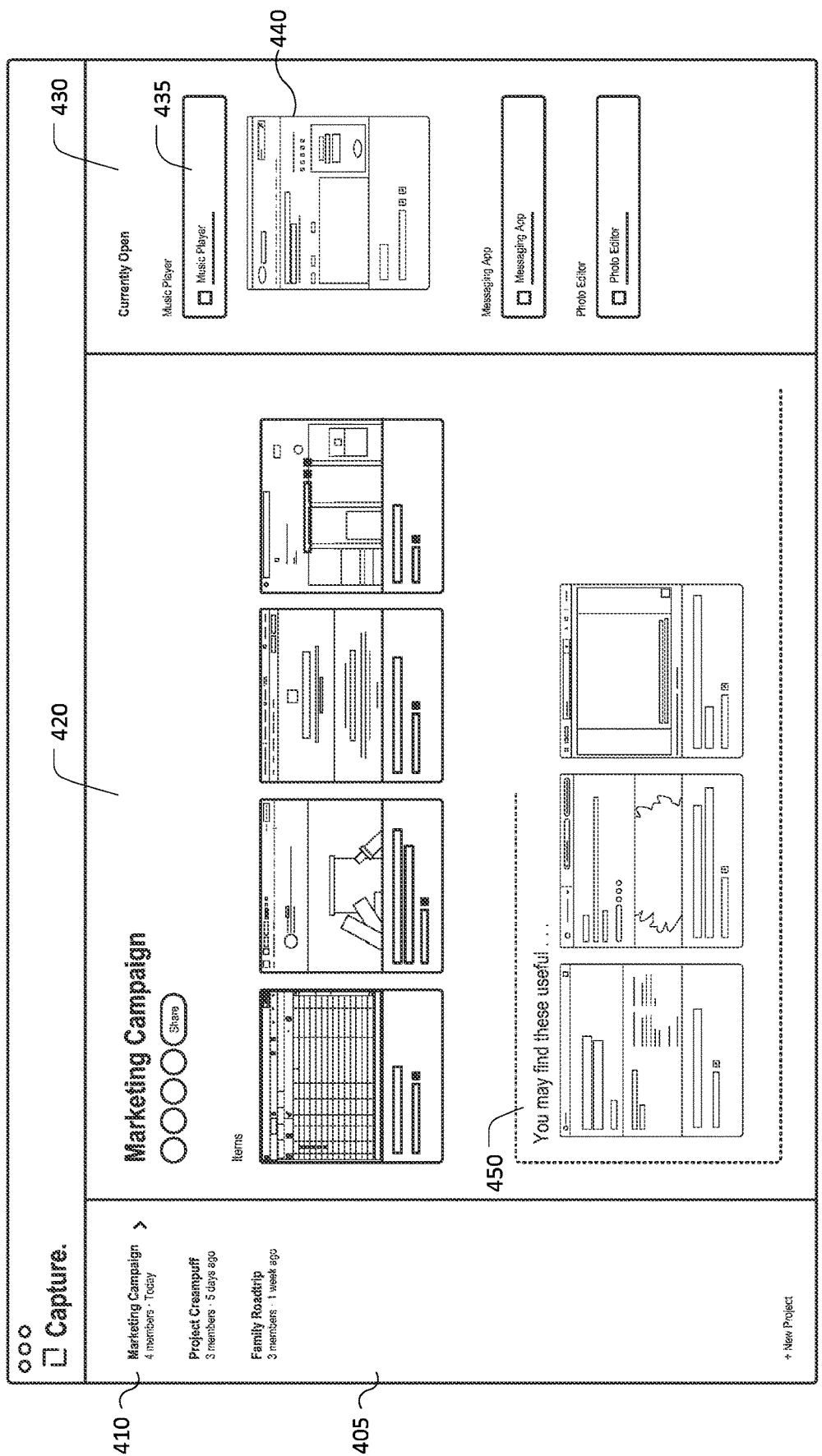
FIGS. 4A and 4B show an example graphical user interface for managing active application content items, in accordance with various embodiments of the subject technology.
Figure 4B:
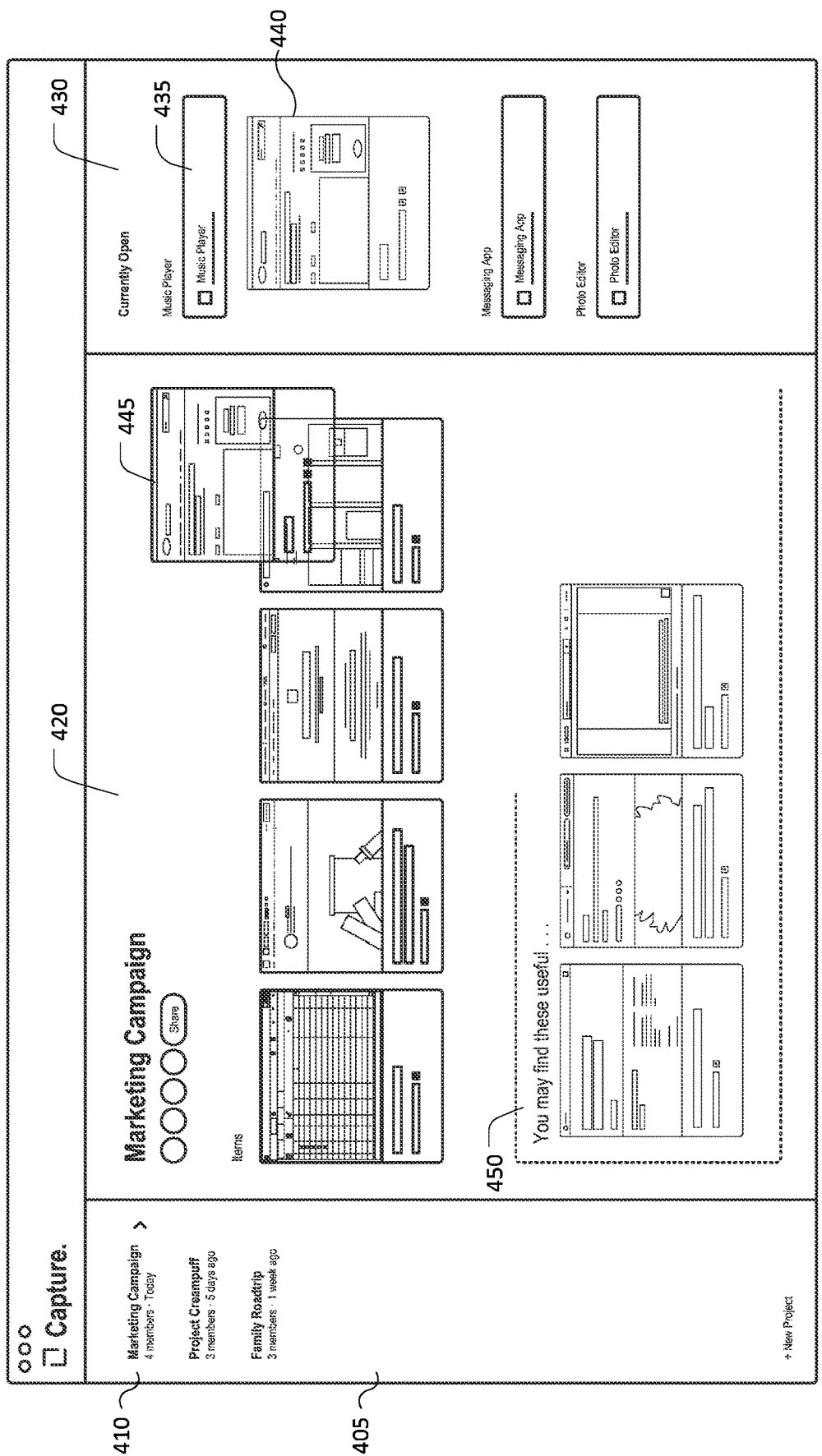

FIGS. 4A and 4B show an example graphical user interface 400 for managing active application content items, in accordance with various embodiments of the subject technology. The graphical user interface 400 may be displayed by a client application (e.g., a web browser or other client application) running on a client device and include a number of representations of active application content items that have been captured and stored. According to some embodiments, active application content items (along with other types of content items) may be organized in groups, sometimes referred to as projects. For example, FIG. 4A shows 3 groups of content items displayed in a project panel 405. In FIG. 4A, the marketing campaign group 410 is selected, which causes the four content items included in the marketing campaign group 410 to be displayed in the middle panel 420.

The right panel 430 of graphical user interface 400 displays a list of client applications that are currently open on the client device. The right panel 430 may also include a snapshot for each active application content item open in the list of client applications. For example, right panel 430 includes snapshot 440 for application 435 that is open on the client device. In some cases, more than one snapshot may be present for multiple active application content items open within an application running on the client device.

Right panel 430 may also serve as a capture interface configured to capture active application content of an open application. For example, a user may capture active application content of an application open on the client device by selecting the snapshot associated with the active application content or dragging the snapshot associated with the active application content and dropping the snapshot into the desired group. For example, a user may drag snapshot 440 representing active application content for application 435 and drop snapshot 440 into middle panel 420 which shows content items included in the marketing campaign group 410 or into marketing campaign group 410 in project panel 405. For example, FIG. 4B shows a visual representation 445 of snapshot 440 being dragged into middle panel 420. This causes an active application content item to be created and associated with marketing campaign group 410.

According to some embodiments, graphical user interface 400 may also provide suggestions for relevant content items (e.g., active application content items or other types of content items). For example, in bottom panel 450, the client application or the content management system may identify one or more content items that may be relevant to the user based on the selected group of content items displayed in middle panel 420. In some cases, machine learning or artificial intelligence techniques may be used to identify content items of interest.

Figure 5:
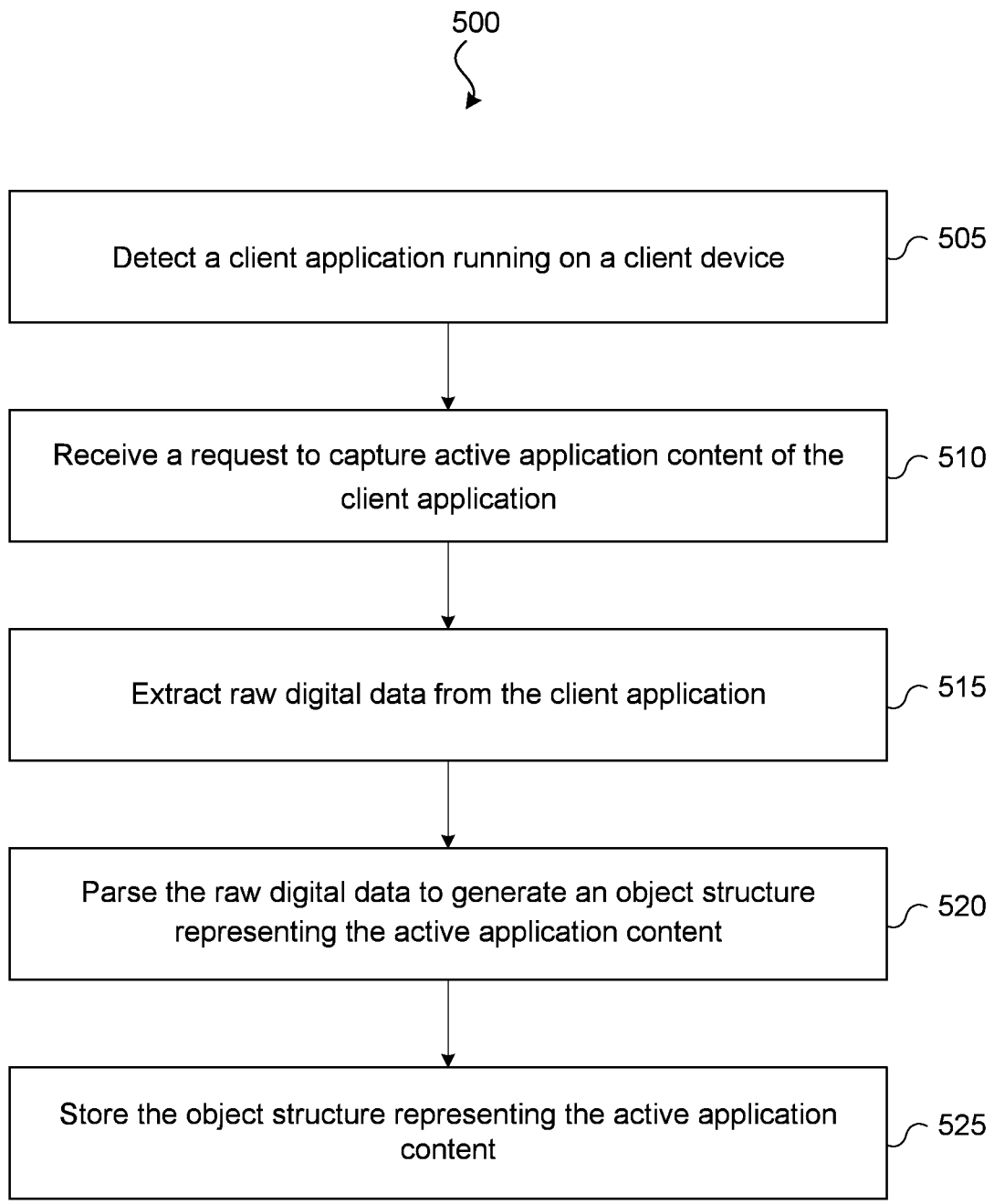
FIG. 5 shows an example method for capturing active application content from a client application running on a client device, in accordance with various embodiments of the subject technology.

FIG. 5 shows an example method 500 for capturing active application content, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 500 may be implemented by computing device such as, for example, a client device running a client application configured to capture active application content. The client device may be, for example, a desktop or laptop computer, a mobile device, a set top box, a smart appliance, a virtual reality device, or any other application configured to aid a user in experiencing digital content. In some embodiments, the client application may be associated with a content management system and be configured to synchronize captured active application content (as well as other content items) with the content management system.

At operation 505, the client device may detect one or more client applications running on the client device. The client applications running on the client device may include, for example, a web browser, a media application configured to stream or play media content (e.g., music, pictures, or video), a file viewing or editing application (e.g., a spreadsheet application, a text document editor, a video editing application, a slideshow application, a computer-aided design application, etc.), virtual or augmented reality application, or any other application configured to aid a user in experiencing digital content. The client device may communicate with the client applications that are running and monitor the application content that is active in each client application. The client device may generate a preview snapshot of the active application content in each running client application and provide a capture interface that includes a list of client applications running on the client device and preview snapshots for the client applications. The capture interface may be, for example, the capture interfaces displayed in FIG. 2 and/or FIG. 4

At operation 510, the client device may receive a request to capture active application content of one of the client applications running on the client device. The request may be received from a user via a capture interface provided on a display (e.g., the capture interfaces of FIG. 2 or FIG. 4) or another capture interface (e.g., a keyboard hotkey, a remote control interface, controller button interface, etc.).

In response to the request, the client device may extract the raw digital data from the client application specified by the request at operation 515. The raw digital data from the client application may include all or portions of digital content or digital content items that is accessible to the client application running on the client device, content information, and client application data, and any other data that can be extracted by the client device in order to capture the active application content for the client application. For example, for a web browser application, the raw digital data may include the web page loaded in the web browser, text, images, or other content in the web page, a URL for the web page, secondary URLs included in the web page, web cookies accessed or stored by the web page, and any other content referenced, retrieved, and/or loaded by the web page. For a music playing application, the raw digital data may include all or a portion of the song file being played, album art associated with the song, song summaries or other text related to the song, one or more timestamps (e.g., a timestamp associated with when a song file began playing, a timestamp associated with when a capture request is received, etc.), metadata associated with the song file (e.g., a song title, artist name, album name, publish date, etc.), a web resource locator for the song file, or any other information associated with the song being played by the music playing application. For a location of interest review application or social media application, the raw digital data may include a record for the location of interest being displayed in the application or a profile for a user or group displayed in the application. The raw digital data may further include any content (e.g., images, videos, reviews, comments, posts, social network, location, etc.) associated with the record or profile displayed by the application.

However, because there many different applications and application types that may run on the client device and access many different types of digital content, the raw digital data may be in many different formats or provided in a non-uniform manner. This increases the difficulty of interpreting the raw digital data and capturing the active application content for the client application. Accordingly, the client device may use an interpreter to make sense of the raw digital data and identify key components that may be used to capture the active application content for the client application. For example, at operation 520, the client device parses the raw digital data in order to generate an object structure representing the active application content.

The object structure representing the active application content may include application data, content data, a preview snapshot of the active application content, and a data block including all or a portion of the raw digital data from the client application running on the client device. The application data may include an application name, some other application identifier, an application type or category, a timestamp associated with the time the active application content was captured or requested, or any other information about the client application that is accessible to the client device. The content data may include a content name, some other content identifier, a content type or category, a location identifier associated with the content data (e.g., a song or other content item) that specifies the user's current location or progress within the content data, content source information (e.g., a URL or location of the content), or any other information about the content that is accessible to the client device. In some cases, the content data may include multiple items of content and the content data may include information for each item of content associated with the client application.

According to some embodiments, the client device may determine what kind of information to store in the object structure based on, for example, the application, the application type, the content type, the content source, or some other information identified in the raw digital data. For example, the client device may be able to parse out far more information than is stored in the object structure for the active application content or the information that is stored may depend on some other information identified in the raw digital data. If the client application is a web browser type application displaying a web resource (e.g., website or other content being displayed in the web browser application), for example, the client device may capture a screenshot of the web resource and use the screenshot as the preview snapshot stored in the object structure. If the client application is a music playing application playing a song on the other hand, the client device may retrieve the album art associated with the song and use the album art as the preview snapshot stored in the object structure. In another example, if the client application is a social media application displaying a user page or a location of interest review application displaying a location of interest page, the client device may retrieve one or more of the images or photos associated with the user page or location of interest page and use the retrieved images or photos as the preview snapshot stored in the object structure associated with the active application content.

Similarly, the data block that is stored in the object structure may also depend on the application, the application type, the content type, the content source, or some other information identified in the raw digital data. Using the example above, if the client application is a web browser type application displaying a web page, the client device may download the web page and store the web page in the data block of the object structure for the active application content. If the client application is a music playing application playing a song on the other hand, the client device may store the song or the portion of the song that is currently being played in the music playing application in the data block of the object structure for the active application content. If the client application is a social media application displaying a user profile or a location of interest review application displaying a location of interest profile, the client device may store different information (e.g., the user profile or the location of interest profile) in the data block of the object structure.

Once the object structure for the application content that is active in the client application is generated, the client device may store the object structure representing the active application content at operation 525. The object structure may be stored locally on the client device and/or transmitted to a content management system (e.g., content management system 110 of FIG. 1) for storage. According to some embodiments, the object structure may be stored as a content item and synchronized on the client device, the content management system, and/or any other client devices authorized to access the object structure.

Once stored, the captured active application content that is represented by the object structure may act as other types of content items stored on the client device and/or managed by the content management system. For example, the captured active application content may be viewed in an interface displayed by the client device, organized along with other items of captured active application content, accessed across multiple client devices, or shared with other users. The captured active application content may be opened by a client application running on the client device and used to recreate the digital experience that was captured in response the user's request. Because the actual all or portions of the content is stored in the data block of the object structure, the digital experience may be recreated even if the original digital content (e.g., a web site or web resource) has been changed or is no longer available.

Figure 6:
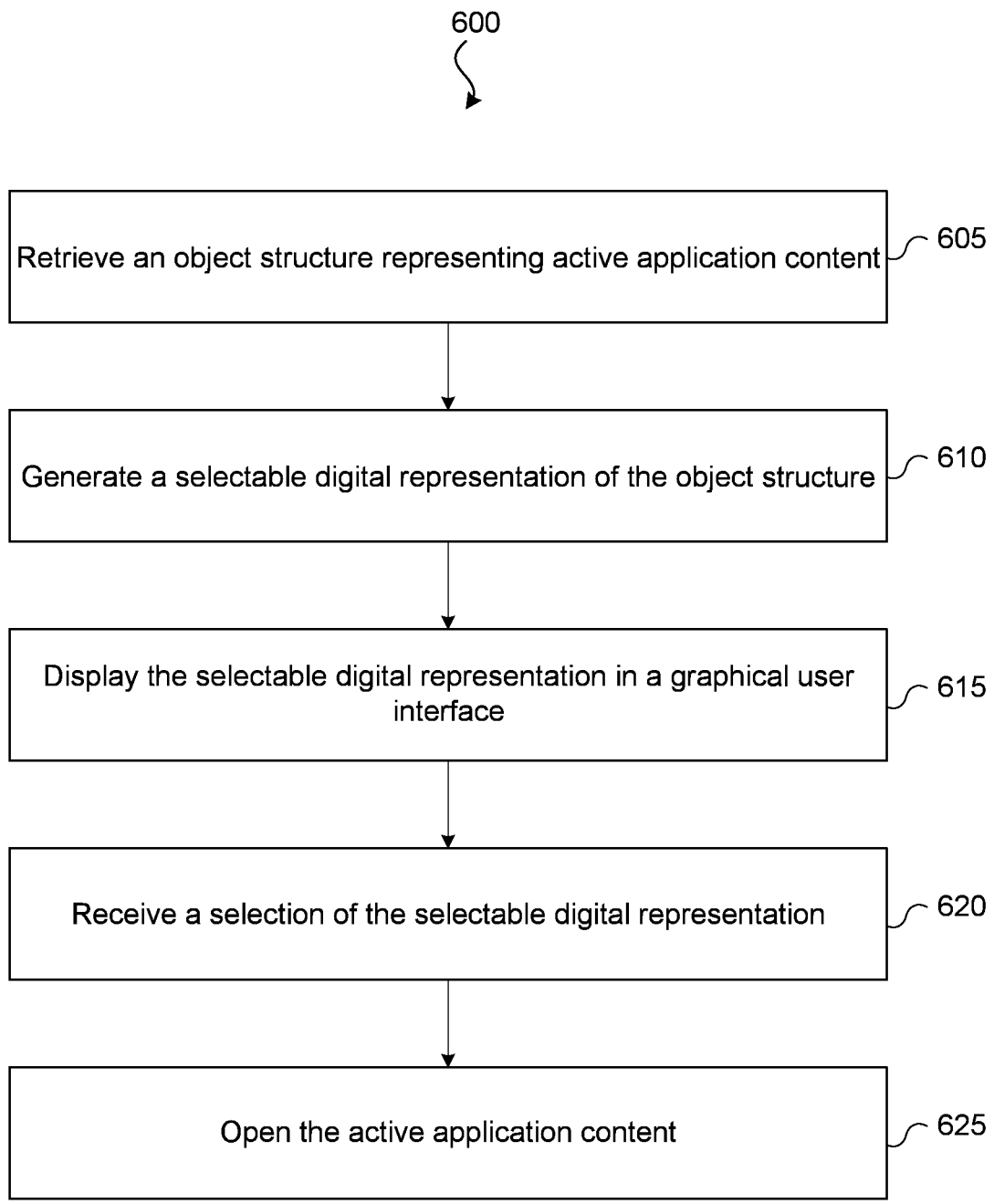
FIG. 6 shows an example method for accessing active application content, in accordance with various embodiments of the subject technology.

FIG. 6 shows an example method 600 for accessing active application content, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by computing device such as, for example, a client device running a client application configured to access active application content.

At operation 605, the client device may retrieve one or more object structures representing active application content that has been captured. In some embodiments, the object structures may be stored locally on the client device, remotely by a content management system, or both. At operation 610, the client device may generate a selectable digital representation of each object structure. Each selectable digital representation may be configured to open the active application content represented by the object structure in response to an input selection. In some embodiments, the selectable digital representations may include or be based on the preview snapshot of the active application content stored in the object structure.

At operation 615, the one or more selectable digital representations are displayed in a graphical user interface such as graphical user interface 300 in FIG. 3 or graphical user interface 400 in FIG. 4. Here, a user may interact with the selectable digital representations of active application content and organize the active application content. For example, the user may delete active application content, move active application content, group sets of active application content items together, etc.

According to some embodiments, the client device may also identify additional content items of interest (e.g., active application content or other content items) based on the data stored and indexed in the one or more object structures for the selectable digital representations displayed in the graphical user interface. These content items of interest may be suggested to the user in the graphical user interface. For example, bottom panel 450 of FIG. 4, suggests content items that may be relevant to the user based on the selected group of content items displayed in middle panel 420.

At operation 620, the client device may receive a user selection of one of the selectable digital representations of active application content. In response to the user selection, the client device may open the active application content associated with the selectable digital representation in a client application. The client application may be the client application associated with the content management system or a client application configured to open the active application content.

In some embodiments, the client device may open the active application content stored in the data block of the object structure associated with the active application content. However, in other embodiments, the client device may identify an original source (e.g., a URL or location) of the active application content and open the active application content from the original source. The original source may also be specified in the object structure for the active application content (e.g., in the content data of the object structure). According to some embodiments, whether the client device opens the active application content from the original source or the data block may depend on configurations settings that may be set for the particular item of active application content, the content type associated with the active application content, the application that is to open the active application content, or the application type of the application that is to open the active application content. The configuration settings may be set by the client device as a default or a user.

Figure 7:
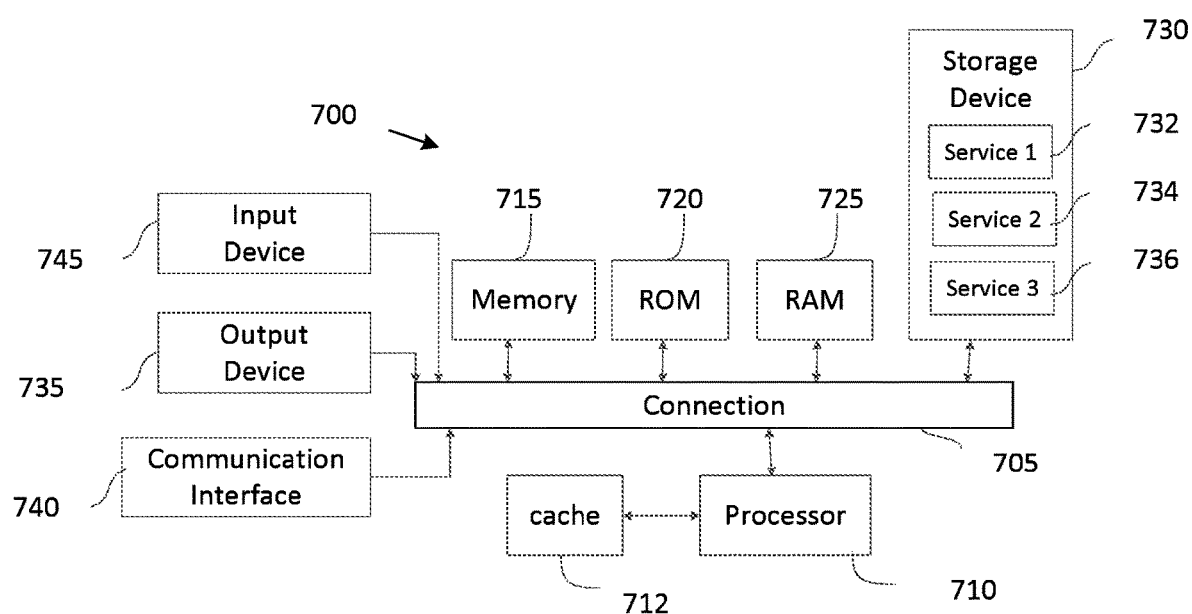
FIG. 7 shows an example of a system for implementing certain aspects of the present technology.

FIG. 7 shows an example of computing system 700 in which the components of the system are in communication with each other using connection 705. Connection 705 can be a physical connection via a bus, or a direct connection into processor 710, such as in chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   retrieving an object structure that captures active application content generated from parsing an open application via a capture interface on a client device, the object structure comprising the active application content that is organized in the object structure to represent the parsed open application and a data block including at least a portion of the active application content;
   generating a selectable digital representation of the active application content that enables access to respective active application content, wherein the selectable digital representation is configured to open the active application content in response to a user input selection via a graphical user interface, the selectable digital representation including one or more representations of the respective active application content; and
   causing display of the generated digital representation of the active application content based on the retrieved object structure in the graphical user interface of the client device.

2. The computer-implemented method of claim 1, further comprising:
   receiving a user selection of the displayed digital representation; and
   in response to receiving the user selection, opening the active application content associated with the selected digital representation.

3. The computer-implemented method of claim 2, wherein the opening the active application content comprises:
   opening the active application content stored in the data block of the object structure.

4. The computer-implemented method of claim 2, wherein the opening the active application content comprises:
   identifying an original source of the active application content and opening the active application content from the original source.

5. The computer-implemented method of claim 4, wherein the original source is specified in the object structure for the active application content.

6. The computer-implemented method of claim 4, wherein opening the active application content depends on configurations settings set for a particular content item of the active application content, a content type associated with the active application content, an application for opening the active application content, or an application type of the application opening the active application content.

7. The computer-implemented method of claim 1, wherein the data block storing the portion of the active application content is application-dependent.

8. A system for capturing active application content, comprising:
   a storage configured to store instructions; and
   at least one processor configured to execute the instructions and cause the at least one processor to:
   receive a request from a client device to capture via a capture interface application content of active applications currently running on the client device;
   retrieve an object structure that captures the active application content generated from parsing an open application via a capture interface on the client device, the object structure comprising the active application content that is organized in the object structure to represent the parsed open application and a data block including at least a portion of the active application content;
   generate a selectable digital representation of the active application content that enables access to respective active application content, wherein the selectable digital representation is configured to open the active application content in response to a user input selection via a graphical user interface, the selectable digital representation including one or more representations of the respective active application content; and
   cause display of the generated digital representation of the active application content based on the retrieved object structure in the graphical user interface of the client device.

9. The system of claim 8, wherein the at least one processor is configured to execute the instructions and cause the at least one processor to:
   receive a user selection of the displayed digital representation; and
   in response to receiving the user selection, open the active application content associated with the selected digital representation.

10. The system of claim 9, wherein the at least one processor is configured to execute the instructions and cause the at least one processor to:
    open the active application content stored in the data block of the object structure.

11. The system of claim 9, wherein the at least one processor is configured to execute the instructions and cause the at least one processor to:
    identify an original source of the active application content and opening the active application content from the original source.

12. The system of claim 11, wherein the original source is specified in the object structure for the active application content.

13. The system of claim 11, wherein opening the active application content depends on configurations settings set for a particular content item of the active application content, a content type associated with the active application content, an application for opening the active application content, or an application type of the application opening the active application content.

14. The system of claim 8, wherein the data block storing the portion of the active application content is application-dependent.

15. A non-transitory computer readable medium comprising instructions, the instructions, when executed by a computing system, cause the computing system to:
retrieve an object structure that captures active application content generated from parsing an open application via a capture interface on a client device, the object structure comprising the active application content that is organized in the object structure to represent the parsed open application and a data block including at least a portion of the active application content;
generate a selectable digital representation of the active application content that enables access to respective active application content, wherein the selectable digital representation is configured to open the active application content in response to a user input selection via a graphical user interface, the selectable digital representation; and
cause display of the generated digital representation of the active application content based on the retrieved object structure in the graphical user interface of the client device.

16. The computer readable medium of claim 15, wherein the computer readable medium further comprises instructions that, when executed by the computing system, cause the computing system to:
receive a user selection of the displayed digital representation; and
in response to receiving the user selection, open the active application content associated with the selected digital representation.

17. The computer readable medium of claim 16, wherein the computer readable medium further comprises instructions that, when executed by the computing system, cause the computing system to:
open the active application content stored in the data block of the object structure.

18. The computer readable medium of claim 16, wherein the computer readable medium further comprises instructions that, when executed by the computing system, cause the computing system to:
identify an original source of the active application content and opening the active application content from the original source.

19. The computer readable medium of claim 18, the original source is specified in the object structure for the active application content.

20. The computer readable medium of claim 18, opening the active application content depends on configurations settings set for a particular content item of the active application content, a content type associated with the active application content, an application for opening the active application content, or an application type of the application opening the active application content.

* * * * *